United States Patent
Yavatkar et al.

(10) Patent No.: US 7,177,323 B2
(45) Date of Patent: Feb. 13, 2007

(54) ENSURING QUALITY OF SERVICE (QOS) FOR A MULTI-MEDIA CALLS THROUGH CALL ASSOCIATED INDIVIDUAL MEDIA STREAM BANDWIDTH CONTROL

(75) Inventors: Rajendra S. Yavatkar, Portland, OR (US); James E. Toga, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 925 days.

(21) Appl. No.: 09/041,979

(22) Filed: Mar. 13, 1998

(65) Prior Publication Data

US 2002/0052958 A1 May 2, 2002

(51) Int. Cl.
*H04L 12/16* (2006.01)
*H00J 3/16* (2006.01)

(52) U.S. Cl. ............................ 370/468; 370/260

(58) Field of Classification Search ............... 370/229, 370/230, 231, 232, 233, 234, 235, 236, 238, 370/252, 253, 433, 437, 465, 468, 477; 709/232, 709/233, 234, 235; 710/29
See application file for complete search history.

(56) References Cited

U.S. PATENT DOCUMENTS

| | | | | |
|---|---|---|---|---|
| 5,164,938 A * | 11/1992 | Jurkevich et al. | ........... | 370/231 |
| 5,461,611 A * | 10/1995 | Drake, Jr. et al. | .......... | 370/420 |
| 5,479,404 A * | 12/1995 | Francois et al. | ............ | 370/468 |
| 5,541,919 A * | 7/1996 | Yong et al. | ................. | 370/416 |
| 5,548,579 A * | 8/1996 | Lebrun et al. | ............... | 370/431 |
| 5,581,703 A * | 12/1996 | Baugher et al. | ............ | 709/225 |
| 5,713,043 A * | 1/1998 | Baugher et al. | ............ | 345/302 |
| 5,745,380 A * | 4/1998 | Sandvoss et al. | ........ | 379/90.01 |
| 5,940,372 A * | 8/1999 | Bertin et al. | ................. | 370/238 |
| 5,953,506 A * | 9/1999 | Kalra et al. | .................. | 709/231 |
| 5,963,547 A * | 10/1999 | O'Neil et al. | ................ | 370/260 |
| 6,028,842 A * | 2/2000 | Chapman et al. | ........... | 370/235 |
| 6,072,773 A * | 6/2000 | Fichou et al. | ............... | 370/230 |
| 6,130,880 A * | 10/2000 | Naudus et al. | .............. | 370/235 |
| 6,188,698 B1 * | 2/2001 | Galand et al. | .............. | 370/412 |
| 6,253,207 B1 * | 6/2001 | Malek et al. | ................ | 707/104 |

\* cited by examiner

*Primary Examiner*—Steven Nguyen
(74) *Attorney, Agent, or Firm*—Blakely, Sokoloff, Taylor & Zafman LLP

(57) ABSTRACT

A multi-media call application is disclosed. The application guarantees quality of service (QOS) for a packet based multi-media call (CALL). The guaranty is effectuated through call associated individual media stream bandwidth control.

33 Claims, 5 Drawing Sheets

ENSURING QUALITY OF SERVICE (QOS) FOR A MULTI-MEDIA CALLS THROUGH CALL ASSOCIATED INDIVIDUAL MEDIA STREAM BANDWIDTH CONTROL

BACKGROUND OF THE INVENTION

1. Field of the Invention

The present invention relates to the field of multi-media calls. More specifically, the present invention relates to the quality of service of multi-media calls.

2. Background Information

As advances in microprocessor and other related technologies continue to improve the price/performance of various electronic components, multi-media calls, such as video conferencing calls, including those calls conducted using personal computers (PC), have become increasingly popular in recent years. Numerous PC based multi-media call products designed to take advantage of the increased processing power of today's PCs are now available in the market place. An example of such multi-media call products is the ProShare™ Video Conferencing product, available from Intel Corp., of Santa Clara, Calif., the assignee of the present invention.

At the same time, with the advances in networking technology, increasing number of computers are connected to one another via private and public networks, such as the Internet, resulting in increasing number of multi-media calls being conducted over the various networks. Many of these networks, such as the Internet, are packet based and "best effort" type of networks. That is, end to end delivery for a packet can take any arbitrary amount of time, and there is no guarantee that the delivery time will be smaller than the latency requirement. Since the media packets of multi-media are isochronous in nature, as a result, the quality of service (QOS) for these multi-media calls cannot be guaranteed.

Recommendation H.323 of the International Telecommunication Union—Technical Section (ITU-T), entitled "Packet Based Multi-Media Communication System", published November 1996, provides for call level admission control into a local area network (LAN) that allows a call to be denied access into the LAN due to its bandwidth limitation. The provision prevents the LAN from being overloaded, and partially addresses the QOS issue. However, potential bandwidth limitations of the intermediate hops remain a problem. Furthermore, merely managing a LAN's bandwidth at the call level often results in waste, as there is no correlation to the actual bandwidth consumption by the media streams of the calls. Notwithstanding these shortcomings, for interoperability reason, increasing number of multi-media call products have implemented support for H.323. Thus, a more efficient and/or effective approach to guaranteeing the QOS of a multi-media call that is compatible with the H.323 recommendation is desired.

SUMMARY OF THE INVENTION

A multi-media call application is disclosed. The application guarantees quality of service (QOS) for a packet based multi-media call (CALL). The guaranty is effectuated through call associated individual media stream bandwidth control.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
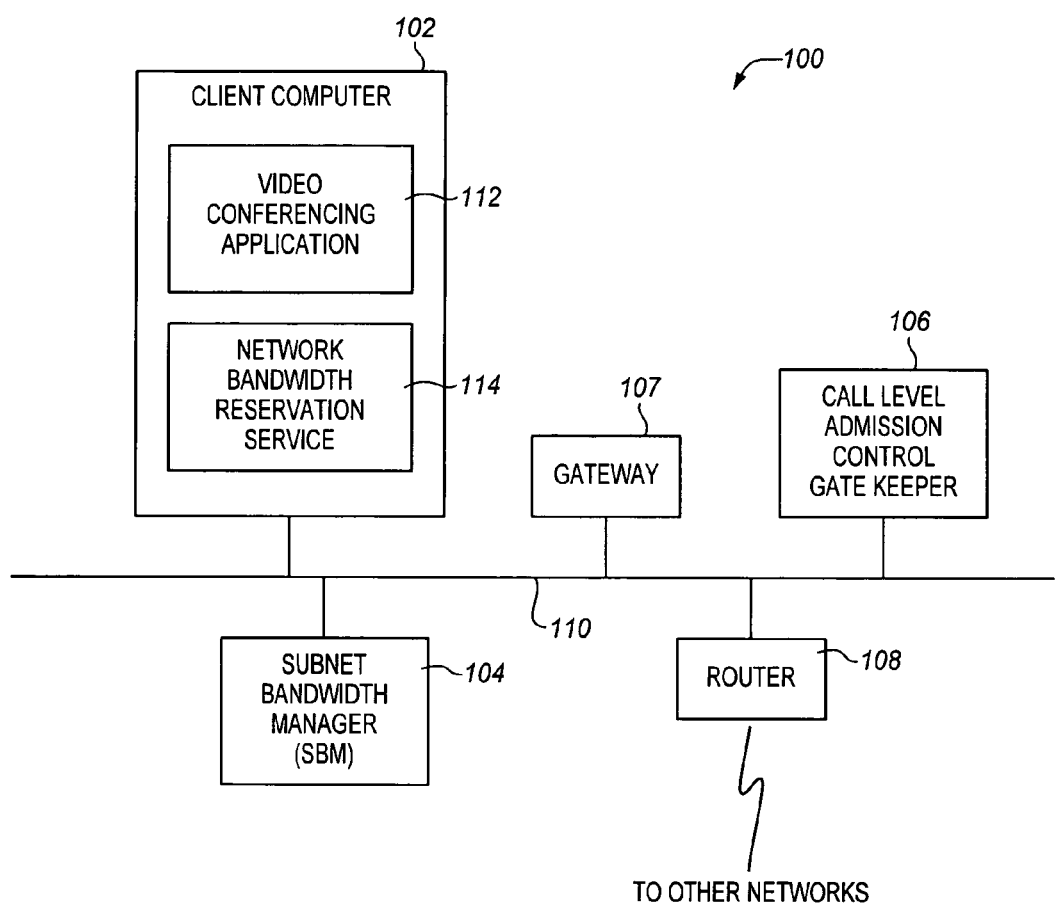
FIG. 1 illustrates an exemplary network suitable for practicing the present invention.

Referring now to FIG. 1, wherein a block diagram illustrating an exemplary network suitable for practicing the present invention. As illustrated, exemplary network 100 includes client computer 102, sub-net bandwidth manager 104 and router 108 coupled to each other through medium 110. Additionally, for the illustrated embodiment, exemplary network 100 includes gatekeeper 106 and gateway 107 coupled to each other and the earlier enumerated elements as shown.

Medium 110 facilitates communication between the coupled elements. For the illustrated embodiment, communication is conducted on a packet basis. The packet based communication may be conducted using any one of a number of protocols known in the art. Medium 110 may be any networking medium and signaling scheme suitable for such packet based communication. An example is the twisted pair medium with electrical signals propagated in accordance with IEEE's 802.3 standard, titled Local Area Network (LAN): Carrier Sense Multiple Access With Collision Detection CSMA/CD (commonly known as Ethernet), published 1985.

Router 108 facilitates internetworking communication between client computer 102, SBM 104, and so forth, with members of other networks. Router 108 is intended to represent a broad category of such elements known in the art, including like elements such as switches, bridges, and so forth.

SBM 104 manages bandwidth of network 100. SBM 104 controls admission of traffic into network 100, including admission by traffic class and reservation of bandwidth for the admitted traffic class. Additionally, SBM 104 in cooperation with other SBMs of other interconnected network enable end-to-end bandwidth reservation on all intermediate hops, from one end to another end of a traffic flow. In one embodiment, SBM 104 manages bandwidth of network 100 and cooperates with other SBMs in accordance with SBM (Subnet Bandwidth Manager): A Protocol for RSVP-based Admission Control over IEEE 802-style networks, draft IETF-ISSL-IS802-SBM-06.TXT, published March, 1998. SBM 104 may be implemented using any one of the servers known in the art. An example of such servers is a Pentium® II processor based server, such as the PowerEdge server available from Dell Computer of Texas. Pentium is a registered trademark of Intel Corp., assignee of the present invention. SBM 104 may also be implemented as a switch or router, such as element 108 described earlier.

Client computer 102 is equipped to enable a user to conduct a packet based multi-media call with a counterpart located at another end point over one or more interconnected networks. Client computer 102 includes in particular multi-media call application 112 and bandwidth reservation service 114. Multi-media call application 112 provides the user with the ability to conduct the multi-media call. Multi-media application 112 conducts the multi-media call using multiple media streams, sending and receiving each media stream over individualized logical channel. For the illustrated embodiment, multi-media application 112 is a video conferencing application that enables the user to conduct video conference calls. The video conferencing application conducts the video conference calls in accordance with ITU-T's H.323 recommendation, using multiple audio and video streams sent and received over individualized logical channels. Additionally, in accordance with the present invention, multi-media application 112 in cooperation with bandwidth reservation service 114 ensure quality of service (QOS) of the multi-media call using call associated individual media stream bandwidth control, to be described more fully below. Except for the teachings of the present invention incorporated in multi-media call application 112 and bandwidth reservation service 114, client computer 102 including multi-media application 112 and bandwidth reservation service 114 are intended to represent a broad category of these elements known in the art. An example of client computer 102 is a Pentium® II processor based multi-media computer, such as the Dimension PCs available from Dell Computer. An example of multi-media call application 112 is earlier described ProShare® Video Conferencing product, available from Intel Corp. An example of bandwidth reservation service 114 is the PC RSVP product, also available from Intel Corp. In an alternate embodiment, bandwidth reservation service 114, including the incorporated teachings of the present invention, is an integral part of the operating system of client computer 102. Examples of such operating system that can include bandwidth reservation service 114 include the Windows® family of operating systems, e.g. Windows® 95, Windows® NT and so forth.

Gatekeeper 106, for the illustrated embodiment, facilitates call level admission control into network 100 for H.323 compliant multi-media calls between end points coupled to network 100, such as client computer 102, and end points outside network 100. Gateway 107 provides real-time, two-way communications between the above described end-points including but not limited to translation of transmission formats. Both gatekeeper 106 and gateway 107 facilitate the call level admission control and real time communication respectively in accordance with ITU-T's H.323 recommendation. Gatekeeper 106 as well as gateway 107 may also be implemented using one or more of a number of servers known in the art.

Figure 2:
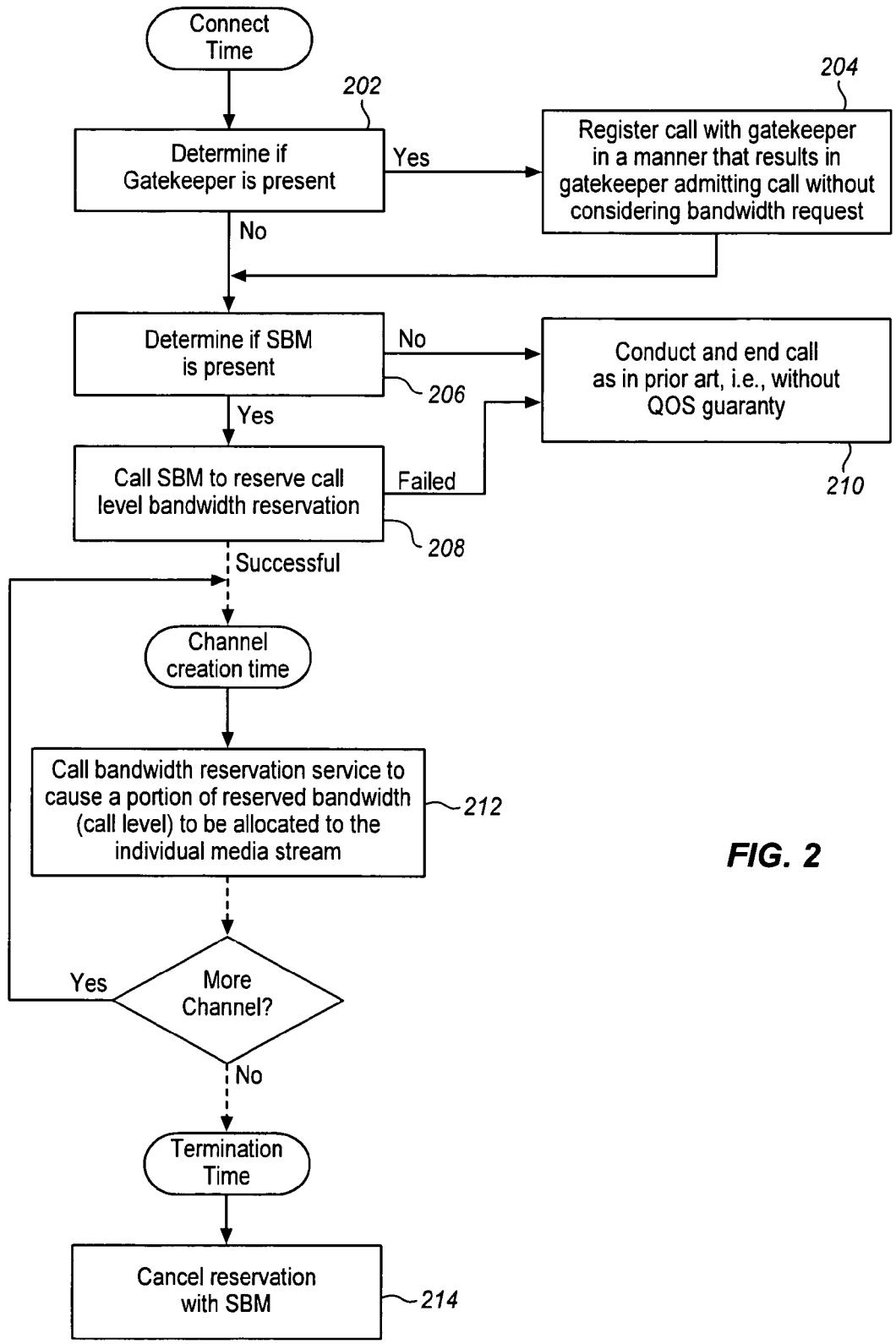
FIG. 2 is a block diagram illustrating one embodiment of the method of the present invention.

Referring now also to FIG. 2, wherein one embodiment of the method step of the present invention is shown. As illustrated, to ensure the QOS of the multi-media call, multi-media call application 112 first reserves bandwidth for the multi-media call through SBM 104 while establishing a connection for the multi-media call, steps 202–208. In alternate embodiments, the call level bandwidth reservation may be made independent of establishing a connection for the multi-media call. Multi-media application 112 then subsequently causes SBM 104 to allocate the reserved call level bandwidth to individual media streams of the multi-media call while establishing logical channels for the individual media streams during the multi-media call, step 212. In alternate embodiments, the allocation of the reserved call level bandwidth to individual media streams may be caused independent of establishing logical channels for the individual media streams. At call termination, multi-media call application 112 notifies SBM 104 of the termination of the call to release the call level bandwidth reservation, while tearing down the connection for the multi-media call, step 214.

For the illustrated embodiment, at steps 202–208, multi-media application 112 first determines whether gatekeeper 106 is present in network 100, step 202. If gatekeeper 106 is present, multi-media application 112 registers the multi-call call with gatekeeper 106, in a manner that causes gatekeeper 106 to determine whether to admit the multi-media call into network 100 without taking into consideration the multi-media call's bandwidth requirement, step 204. The discovery of gatekeeper 106 may be accomplished through any one of a number of known methods, including but not limited to referencing a statically stored value and address of its controlling gatekeeper at a predetermined location, or issuing queries on network 100 to solicit response from gatekeeper 106. In one embodiment, the required manner of registration is accomplished by registering the multi-media call with gatekeeper 106 and requesting gatekeeper 106 to set aside zero bandwidth for the multi-media call. This conditional registration enables the present invention to be practiced for H.323 compliant multi-media calls, especially when a H.323 compliant gatekeeper is present in the network to which client computer 102 is attached.

Upon either determining that gatekeeper 106 is not present in network 100 or registering the multi-media call with gatekeeper 106 in the required manner, multi-media application 112 determines if SBM 102 is present in network 100, step 206. If SBM 102 is not present, multi-media application 112 continues the call as in the prior art, i.e. with QOS guaranty for the multi-media call, step 208. On the other hand, if SBM 102 is present, multi-media application 112 registers the call with SBM 102 and requesting SBM 102 to reserve bandwidth for the multi-media call, step 210. In response, if sufficient bandwidth exists in network 100, SBM 102 admits the multi-media call and reserves the requested bandwidth in network 100. If insufficient bandwidth exists in network 100, SBM 104 rejects the request. In one embodiment, the bandwidth reservation is accomplished by SBM 104 in accordance with the above described SBM protocol, with new messages defined in accordance with the present invention, to be described more fully below. In one embodiment, if the call level bandwidth reservation with SBM 104 is rejected, multi-media application 112 continues the multi-media call without QOS guaranty, step 208. In an alternate embodiment, multi-media application 112 terminates the multi-media call for insufficient network resources.

At step 212, while establishing a logical channel for the media stream, if the multi-media call was admitted by SBM 104, multi-media call application 112 calls bandwidth reservation service 114 to request SBM 104 to allocate a portion of the call level bandwidth reservation for a media stream. Multi-media call application 112 provides call level information to bandwidth reservation service 114 for inclusion in the request, such that SBM 104 can associate the media stream with the appropriate call level bandwidth reservation. The call level information include call type, e.g. H.323, call ID, and endpoint ID. Endpoint ID includes information such as Internet Protocol (IP) address, protocol ID and port number. The request to bandwidth reservation service 114 may be made in any one of a number of known inter-program communication techniques. In alternate embodiments, multi-media call application 112 may perform this request itself. However, in a bandwidth managed network, it is likely such bandwidth reservation service will be provided by either a utility or as an integral part of the operating system, as more than one application will likely want to leverage on the fact that the network bandwidth is being managed. Thus, it is more efficient to effectuate the desired allocation by invoking the common service.

In response, bandwidth reservation service 114 requests SBM 104 to allocate a portion of the call level bandwidth reservation to the media stream, including the call level information in the request to enable SBM 104 to associate the media stream with the appropriate call level bandwidth reservation. In the above described embodiment where bandwidth reservation service 114 is implemented using PC-RSVP, communications between PC-RSVP and SBM 104 are conducted using conventional RSVP messages. In turn, SBM 104 makes the allocation accordingly in network 100, as well as requests networking equipment of the intermediate hops to do so through SBMs of the interconnected networks of the intermediate hops. As a result, QOS of the multi-media call can be ensured. For the illustrated embodiment, communications between SBM 104 and SBMs of the interconnected networks of the intermediate hops are conducted using messages and protocol in accordance with the above described SBM protocol.

In one embodiment, SBM 104 also provides feedback to multi-media application 112 through bandwidth reservation service 114 if it fails to establish end-to-end bandwidth reservation for an individual media stream. In response, multi-media application 112 adjusts the operating parameters of the multi-media call to ensure the user continues to perceive performance commensurate with QOS guaranteed, e.g. temporarily slowing down video refresh rate, or switching to periodic still images as opposed to live video and so forth. In one embodiment, multi-media call application 112 may also adjust the call level bandwidth reservation with SBM 104 during the multi-media call. In one embodiment, the call level reservation is treated by SBM 104 as a "soft" reservation. If the reserved bandwidth is not being used for a predetermined period, e.g. multi-media application 112 fails to cause the reserved bandwidth to be allocated to individual media streams within the time period, SBM 104 releases the reservation.

Figure 3A:
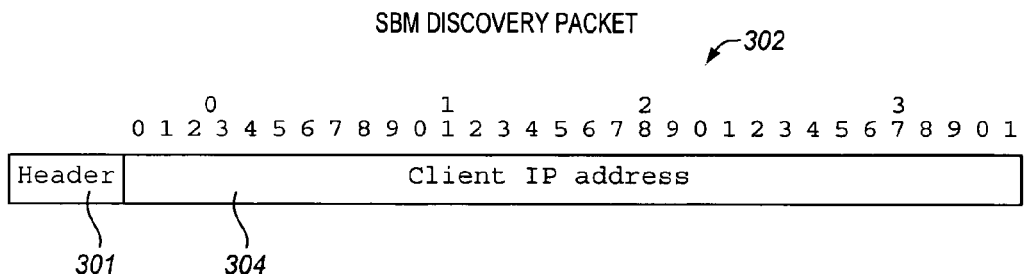
FIGS. 3a–3g are block diagrams illustrating one embodiment each of various bandwidth reservation related messages of the present invention.
Figure 3B:
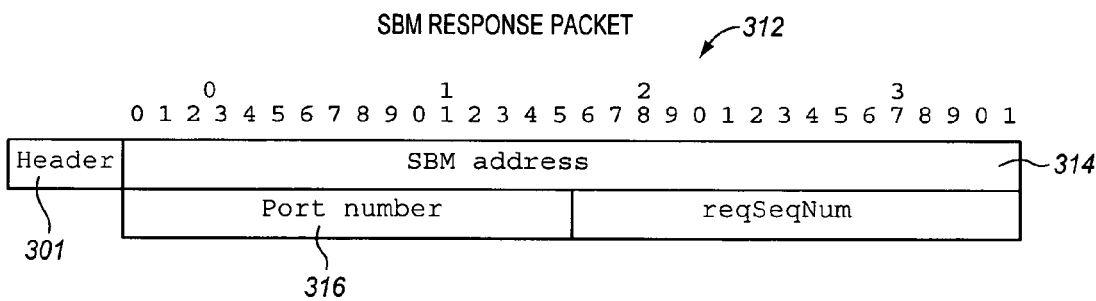

FIG. 3a illustrates one embodiment of a discovery packet for use by multi-media application 112 to discover the presence of SBM 104 in network 100. For the illustrated embodiment, discovery packet 302 includes common header 301 (to be described more fully below) and client computer's IP address 304. In one embodiment, discovery packet 302 is sent to a predetermined IP multi-cast address and a predetermined User Datagram Protocol (UDP) port number with the "IP_MULTICAST_TTL" value set to 1. FIG. 3b illustrates one embodiment of a response packet for use by SBM 104 to respond to the multi-media call application's discovery packet. For the illustrated embodiment, response packet 312 includes common header 301, SBM's IP address 314, and a UDP port number 316 at which SBM 104 listens for incoming requests.

Figure 3C:
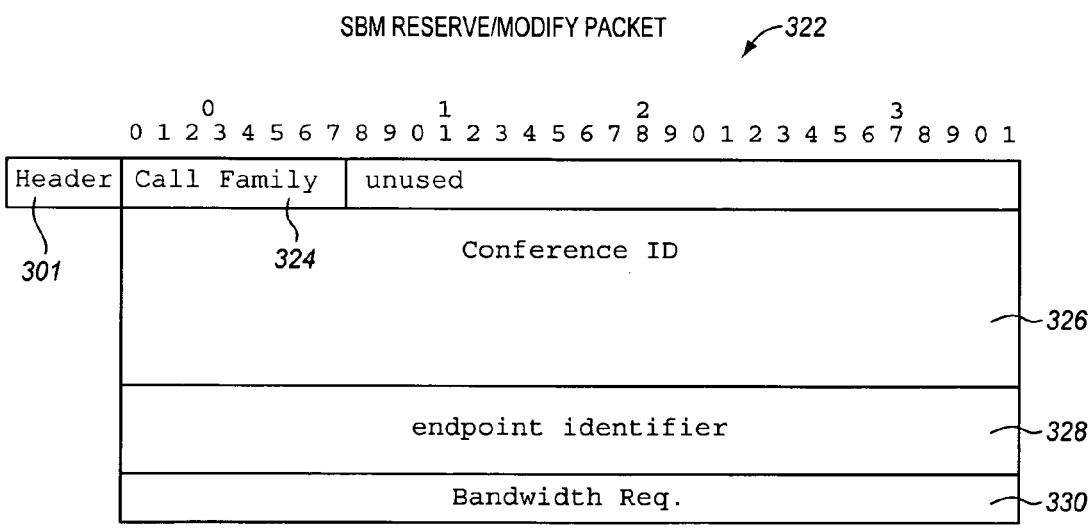
Figure 3D:
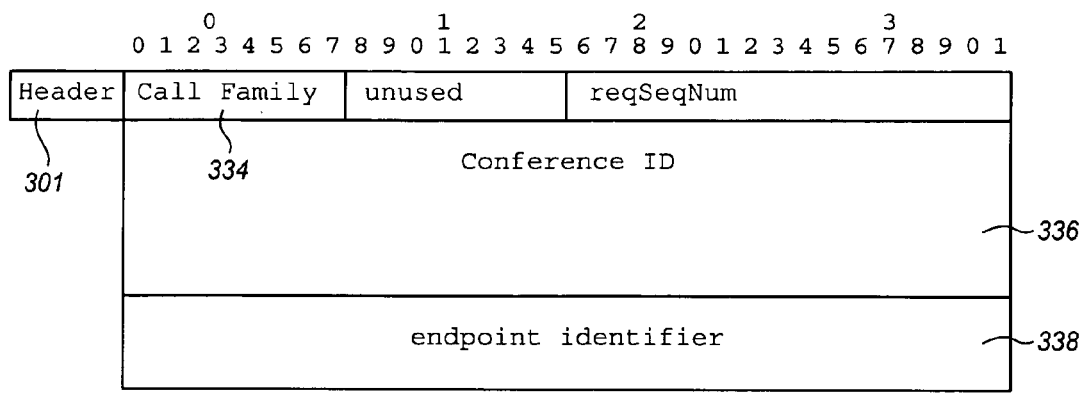

FIG. 3c illustrates one embodiment of a call level bandwidth reservation packet for use by multi-media application 112 to reserve call level bandwidth reservation or subsequently modify the reservation with SBM 104. For the illustrated embodiment, call level bandwidth reservation/modification packet 322 includes common header 301, call family identifier 324, call identifier 326, endpoint identifier 328 and bandwidth requirement 330. Call family identifier 324 specifies the call class, e.g. H.323. Call identifier 326 uniquely identifies the multi-media call. End-point identifier 328 uniquely identifies the "requester" of the call level bandwidth, including e.g. IP address and port number of client computer 102 as well as a protocol ID. Bandwidth requirement 330 specifies the call level bandwidth requested, e.g. in bits per second. FIG. 3d illustrates one embodiment of a call level bandwidth request confirmation packet for use by SBM 104 to respond to the multi-media call application's call level bandwidth reservation/modification packet. For the illustrated embodiment, confirmation packet 332 includes common header 301, call family identifier 334, call identifier 336, endpoint identifier 338. Call family identifier 334, call identifier 336, and end-point identifier 338 have the same meanings as described earlier for call family identifier 324, call identifier 326, and end-point identifier 328.

Figure 3E:
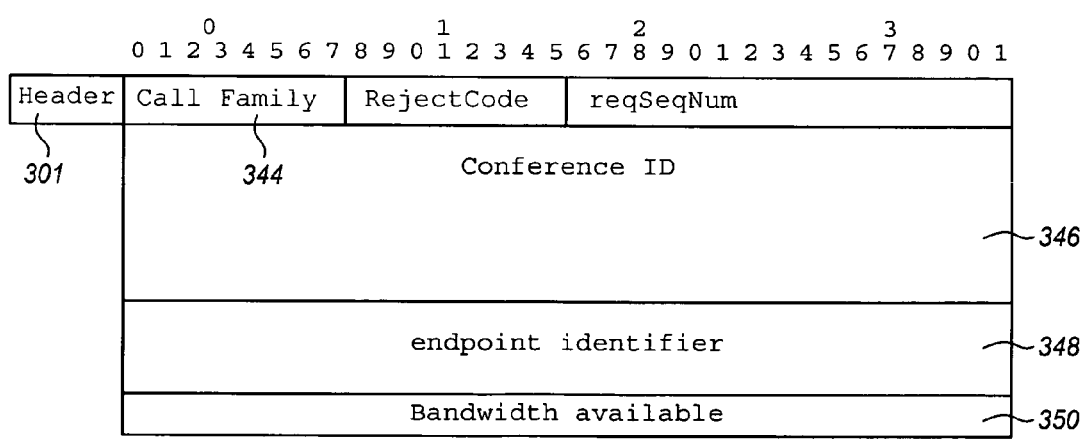
Figure 3F:
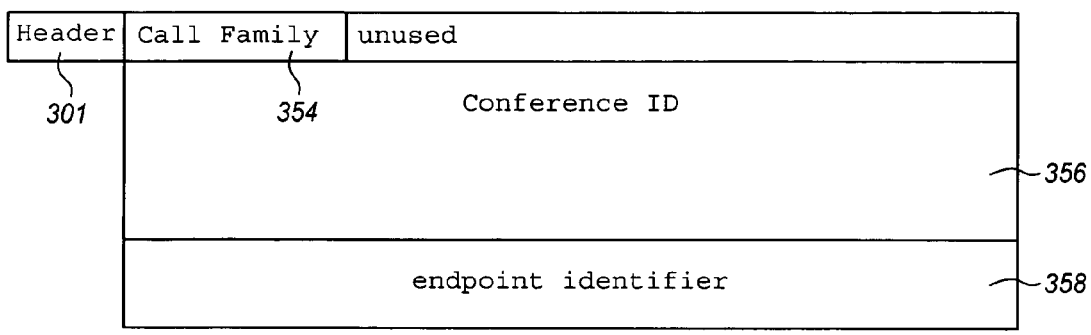

FIG. 3e illustrates one embodiment of a call level bandwidth request rejection packet for use by SBM 104 to respond to the multi-media call application's call level bandwidth reservation/modification packet. For the illustrated embodiment, rejection packet 342 includes common header 301, call family identifier 344, call identifier 346, endpoint identifier 348, rejection code 349 and bandwidth available 350. Call family identifier 344, call identifier 346, and end-point identifier 348 have the same meanings as like elements described earlier for reservation and confirmation packets 322 and 332. Rejection code 349 denotes the reason for rejection, and if the reason is for insufficient bandwidth, bandwidth available 350 denotes the amount of bandwidth available for reservation. FIG. 3f illustrates one embodiment of a call disengage packet for use by multi-media application 112 to notify SBM 104 of the termination of the multi-media call. For the illustrated embodiment, call disengage packet 352 includes common header 301, call family identifier 354, call identifier 356 and endpoint identifier 358, having meanings similar to like elements of the other packets.

Figure 3G:
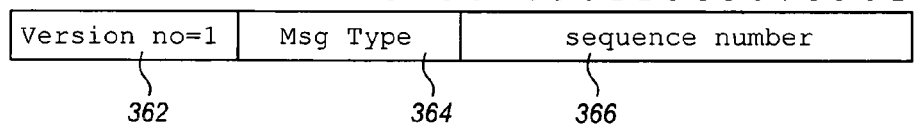

FIG. 3g illustrates one embodiment of common header 301. For the illustrated embodiment, common header 301 includes version number 362, message type 364, and sequence number 366. Version number 362 denotes the version level of the protocol. Message type 364 denotes the nature of the message. In one embodiment, "1" denotes a discovery packet, "2" denotes a response packet, "3"

denotes a reserve packet, "4" denotes a reserve confirmation packet, "5" denotes a reservation rejection packet, "6" denotes a modify packet, "7" denotes a modify confirmation packet, and "8" denotes a disengage packet. Sequence number 366 is a non-decreasing message number generated by the sender.

While the present invention has been described in terms of the above illustrated embodiments, those skilled in the art will recognize that the invention is not limited to the embodiments described. The present invention can be practiced with modification and alteration within the spirit and scope of the appended claims. In particular, network 100 may have one or more client computers, one or more SBM (by segment), one or more routers, and so forth. The description is thus to be regarded as illustrative instead of restrictive on the present invention.

Thus, a method for ensuring the quality of service for a multi-media conference call using call associated individual media stream bandwidth control has been described.

What is claimed is:

1. A storage medium having stored therein a plurality of programming instructions executable by a processor, wherein when executed, the programming instructions implement a multi-media call application that effectuate quality of service (QOS) guaranty for a packet based multi-media call (CALL) through call associated individual media stream bandwidth control.

2. The storage medium as set forth in claim 1, wherein the programming instructions determine if a sub-net bandwidth manager (SBM) that manages network bandwidth is connected to a local area network (LAN) through which the CALL is conducted, and if the SBM is connected to the LAN, register the CALL with the SBM and reserve with the SBM bandwidth for subsequent allocation to media streams of the CALL.

3. The storage medium as set forth in claim 2, wherein the programming instructions make the determination, registration and bandwidth reservation for subsequent allocation to media streams of the CALL as an integral part of establishing a connection for the CALL.

4. The storage medium as set forth in claim 2, wherein the programming instructions further subsequently cause the SBM to allocate the reserved bandwidth for the CALL to individual media streams of the CALL.

5. The storage medium as set forth in claim 4, wherein the programming instructions invoke a bandwidth reservation service to request the SBM to allocate the reserved bandwidth for the CALL to individual ones of the media streams of the CALL, providing call level information to the bandwidth reservation service to enable the bandwidth reservation service to include the call level information in the requests for the SBM.

6. The storage medium as set forth in claim 5, wherein the programming instructions invoke the bandwidth reservation service to request the SBM to allocate a portion of the reserved bandwidth for the CALL to an individual media stream of the CALL while establishing an individual channel for the individual media stream during the CALL.

7. The storage medium as set forth in claim 1, wherein the CALL is an ITU-T H.323 compatible video conference call.

8. The storage medium as set forth in claim 7, wherein the programming instructions further determine if a call level admission control gatekeeper is connected to a local area network (LAN) through which the CALL is to be conducted, and if the call level admission control gatekeeper is connected to the LAN, register the CALL with the call level admission control gatekeeper, the registration being made in a manner that causes the call level admission control gatekeeper to determine whether to admit the CALL into the LAN without taking into consideration bandwidth requirement of the CALL.

9. The storage medium as set forth in claim 8, wherein the programming instructions make the determination and conditional registration as an integral part of establishing a connection for the CALL.

10. A storage medium having stored therein a plurality of programming instructions executable by a processor, wherein when executed, the programming instructions implementing a bandwidth reservation service that requests a sub-net bandwidth manager (SBM) to allocate a portion of reserved bandwidth for a packet based multi-media call (CALL) to an individual media stream of the CALL, providing the SBM with call level information to allow the SBM to associate the individual media stream of the CALL with the reserved bandwidth of the CALL, the SBM managing network bandwidth of a local area network (LAN) through which the CALL is conducted.

11. The storage medium as set forth in claim 10, wherein the programming instructions request the SBM to allocate a portion the reserved bandwidth of the CALL to the individual media stream of the CALL while establishing an individual channel for the individual media stream during the CALL.

12. The storage medium as set forth in claim 10, wherein the programming instructions are integral part of an operating system.

13. The storage medium as set forth in claim 10, wherein the CALL is an ITU-T H.323 compatible video conference call.

14. A method comprising:
   (a) a multi-media call application first reserving bandwidth for media streams of a packet based multi-media call (CALL) at a call level with a sub-net bandwidth manager (SBM) that manages network bandwidth of a local area network (LAN) through which the CALL is to be conducted; and
   (b) the multi-media call application subsequently causing the SBM to allocate the reserved bandwidth for the CALL to individual media streams of the CALL, causing call level information to be provided to the SBM to enable the SBM to associate the individual media streams of the CALL with the reserved bandwidth of the CALL.

15. The method as set forth in claim 14, wherein (a) is performed as an integral part of the multi-media call application establishing a connection for the CALL.

16. The method as set forth in claim 14, wherein (b) comprises the multi-media call application invoking a bandwidth reservation service to request the SBM to allocate the reserved bandwidth for the CALL to the individual media streams of the CALL, providing the bandwidth reservation service with call level information for inclusion in the requests to enable the SBM to associate the individual media streams of the CALL with the CALL.

17. The method as set forth in claim 16, wherein (b) is performed on a per individual media stream basis as an integral part of establishing an individual channel for the individual media stream.

18. The method as set forth in claim 14, wherein the method further comprises (c) the multi-media call application determining if a call level admission control gatekeeper is connected to the LAN while establishing connection for the CALL.

19. The method as set forth in claim 18, wherein if the call level admission control gatekeeper is connected to the LAN, (c) further comprises the multi-media application registering the CALL with the call level admission control gatekeeper in a manner that causes the gatekeeper to determine whether to admit the CALL into the LAN without taking into consideration bandwidth requirement of the CALL.

20. An apparatus comprising:
a storage medium having stored therein a plurality of programming instructions implementing a multi-media call application that effectuates quality of service (QOS) guaranty for a packet based multi-media call (CALL) using call associated individual media stream bandwidth control; and
a processor coupled to the storage medium that operates to execute the programming instructions.

21. The apparatus as set forth in claim 20, wherein the programming instructions determine if a sub-net bandwidth manager (SBM) that manages network bandwidth is connected to a local area network (LAN) through which the Call is conducted, and if the SBM is connected to the LAN, register the CALL with the SBM and reserve with the SBM bandwidth for subsequent allocation to media streams of the CALL.

22. The apparatus as set forth in claim 21, wherein the programming instructions make the determination, registration and bandwidth reservation for subsequent allocation to media streams of the CALL as an integral part of establishing a connection for the CALL.

23. The apparatus as set forth in claim 21, wherein the programming instructions further subsequently cause the SBM to allocate the reserved bandwidth for the CALL to individual media streams of the CALL.

24. The apparatus as set forth in claim 23, wherein the programming instructions invoke a bandwidth reservation service to request the SBM to allocate the reserved bandwidth for the CALL to individual ones of the media streams of the CALL, providing call level information to the bandwidth reservation service to enable the bandwidth reservation service to include the call level information in the requests for the SBM.

25. The apparatus as set forth in claim 24, wherein the programming instructions invoke the bandwidth reservation service to request the SBM to allocate a portion of the reserved bandwidth for the CALL to an individual media stream of the CALL while establishing an individual channel for the individual media stream during the CALL.

26. An apparatus comprising:
a storage medium having stored therein a plurality of programming instructions implementing a bandwidth reservation service that requests a sub-net bandwidth manager (SBM) to allocate a portion of reserved bandwidth for a packet based multi-media call (CALL) to an individual media stream of the CALL, providing the SBM with call level information to allow the SBM to associate the individual media stream of the CALL with the reserved bandwidth of the CALL, the SBM managing network bandwidth of a local area network (LAN) through which the CALL is conducted; and
a processor coupled to the storage medium that operates to execute the programming instructions.

27. The apparatus as set forth in claim 26, wherein the programming instructions request the SBM to allocate a portion the reserved bandwidth of the CALL to the individual media stream of the CALL while establishing an individual channel for the individual media stream during the CALL.

28. The apparatus as set forth in claim 26, wherein the programming instructions are integral part of an operating system.

29. A network comprising:
a first client computer;
a medium coupled to the first client; and
a second client computer, coupled to the medium, that effectuates quality of service (QOS) guaranty for a packet based multi-media call (CALL) to the first client computer through call associated individual media stream bandwidth control.

30. The network as set forth in claim 29, further comprising:
a subnet bandwidth manager (SBM), coupled to the medium, that manages the bandwidth of the network.

31. The network as set forth in claim 30, wherein the second client computer comprises:
a multi-media application that effectuates the QOS guaranty; and
a network bandwidth reservation service that requests the SBM to allocate a portion of reserved bandwidth for the CALL to an individual media stream of the CALL, providing the SBM with call level information to allow the SBM to associate the individual media stream of the CALL with the reserved bandwidth of the CALL, the SBM managing network bandwidth of a local area network (LAN) through which the CALL is conducted.

32. The network as set forth in claim 31, wherein the network bandwidth reservation service, provides the SBM with call level information to allow the SBM to associate the individual media stream of the CALL with the reserved bandwidth of the CALL.

33. The network as set forth in claim 30, further comprising:
a gateway coupled to the medium;
a gatekeeper coupled to the medium; and
a router coupled to the medium.

* * * * *